United States Patent
Burger et al.

(10) Patent No.: US 9,297,879 B2
(45) Date of Patent: Mar. 29, 2016

(54) METHOD FOR TRACKING A SOLAR GENERATOR TO THE SUN, CONTROL FOR A SOLAR PLANT AND SOLAR PLANT

(75) Inventors: Bruno Burger, Freiburg (DE); Olivier Stalter, Strasbourg (FR)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 119 days.

(21) Appl. No.: 13/229,874

(22) Filed: Sep. 12, 2011

(65) Prior Publication Data
US 2012/0037209 A1 Feb. 16, 2012

Related U.S. Application Data

(63) Continuation of application No. PCT/EP2010/053141, filed on Mar. 11, 2010.

(30) Foreign Application Priority Data

Mar. 13, 2009 (DE) .......................... 10 2009 013 113

(51) Int. Cl.
*G01S 3/786* (2006.01)
*F24J 2/38* (2014.01)
*H02S 20/32* (2014.01)

(52) U.S. Cl.
CPC ................ *G01S 3/7861* (2013.01); *F24J 2/38* (2013.01); *H02S 20/32* (2014.12); *Y02E 10/47* (2013.01)

(58) Field of Classification Search
USPC ................ 126/571–575, 578, 600–605, 776; 250/203.4; 353/3; 136/243–265
See application file for complete search history.

(56) References Cited

U.S. PATENT DOCUMENTS

| | | | | |
|---|---|---|---|---|
| 4,320,288 A | * | 3/1982 | Schlarlack | 250/203.4 |
| 4,868,379 A | | 9/1989 | West | |
| 6,080,927 A | * | 6/2000 | Johnson | 136/248 |
| 6,363,928 B1 | * | 4/2002 | Anderson, Jr. | 126/577 |
| 2004/0079863 A1 | * | 4/2004 | Lasich | 250/203.4 |
| 2005/0116671 A1 | | 6/2005 | Minami et al. | |
| 2006/0054210 A1 | * | 3/2006 | Proisy et al. | 136/244 |

(Continued)

FOREIGN PATENT DOCUMENTS

| | | |
|---|---|---|
| DE | 202 04 679 U1 | 9/2002 |
| DE | 10 2006 058 845 B3 | 4/2008 |

(Continued)

OTHER PUBLICATIONS

"Tutorial 886: Selecting the right comparator," Published by Maxim Integrated, (2001), [retrieved from internet at http://pdfserv.maximintegrated.com/en/an/AN886.pdf on Mar. 29, 2013].*

(Continued)

*Primary Examiner* — Susan D Leong
*Assistant Examiner* — Eric R Smith
(74) *Attorney, Agent, or Firm* — Keating & Bennett, LLP (57) ABSTRACT

The present invention describes a method for tracking a solar generator having a plurality of solar modules to the sun, wherein at least one electric output quantity of part of the solar module of the solar generator is detected and a tracker, on which the solar generator is mounted, is controlled such that the detected electric output quantity has a predetermined value. Further, a control for a solar plant and a solar plant having such a control are described.

18 Claims, 7 Drawing Sheets

(56) References Cited

U.S. PATENT DOCUMENTS

| | | |
|---|---|---|
| 2009/0038608 A1* | 2/2009 | Caldwell .................... 126/600 |
| 2009/0050192 A1* | 2/2009 | Tanaka et al. ............... 136/246 |
| 2009/0126774 A1* | 5/2009 | Taylor et al. ................. 136/244 |
| 2009/0145480 A1* | 6/2009 | Adest et al. ................... 136/259 |
| 2009/0205637 A1* | 8/2009 | Moore et al. ................. 126/576 |
| 2010/0126553 A1 | 5/2010 | Burger et al. |

FOREIGN PATENT DOCUMENTS

| | | | |
|---|---|---|---|
| EP | 2 012 363 A1 | 1/2009 | |
| ES | 2 273 576 B1 | 5/2007 | |
| JP | 2000-196126 A | 7/2000 | |

OTHER PUBLICATIONS

Definition of ephemeris/ephemerides, Merriam Webster, [retrieved from internet at http://www.merriam-webster.com/dictionary/ephemerides on Mar. 29, 2013].*

* cited by examiner

METHOD FOR TRACKING A SOLAR GENERATOR TO THE SUN, CONTROL FOR A SOLAR PLANT AND SOLAR PLANT

CROSS-REFERENCE TO RELATED APPLICATIONS

This application is a continuation of International Application No. PCT/EP2010/053141, filed Mar. 11, 2010, which is incorporated herein by reference in its entirety, and additionally claims priority from German Application No. DE 102009013113.2, filed Mar. 13, 2009, which is incorporated herein by reference in its entirety.

BACKGROUND OF THE INVENTION

The present invention relates to a method for tracking a solar generator to the sun, to a control for a solar plant as well as to a solar plant. In particular, the present invention relates to an approach for tracking a solar generator having a plurality of solar modules to the sun based on an electric output quantity of at least part of the solar modules of the solar generator.

Apparatuses for tracking a solar generator to the current position of the sun, so-called trackers, are known in the art, wherein one example is described in DE 20204679 U1. Further, reference is made to DE 102006058845 B3, also showing such a tracker. The drives of such apparatuses guide the solar generators in azimuth and/or elevation direction to the sun, such that at all times a maximum possible solar radiation impinges on the solar generator. For this, such known apparatuses comprise a sensor generating an intensity signal depending on the light impinging thereon, which is provided to a circuit integrated in the control unit, which passes a control signal to a drive of the tracker to effect the respective orientation of the solar generator to the brightest spot in the sky.

Alternatively or additionally to the sensor, the control can control the tracker based on the calculation of sun ephemerides in order to effect respective tracking of the solar generator to the sun. Such a system is described, for example in ES 2 273 576 B1.

Thus, such known tracker systems try to optimize the output power of the solar generator by following the sun cross the sky to obtain maximum sunlight output. By tracking the solar generator, typically, an increase of the output of, for example, +28% in Central Europe up to +54% in Northern Europe can be obtained.

However, the above-described known approaches for tracking a solar generator to the sun, have different disadvantages. The embodiment comprising a sensor for detecting sunlight is disadvantageous, since sufficiently exact position determination and respective control of the tracker system is only possible with clear sky. When it is cloudy, these sensors are less useful. Further, such sensors acquire exact installation at the solar generator or with respect to the solar generator and respective calibration. Further, such positioning sensors are expensive and prone to contamination, such that even with clear sky no sufficiently exact position determination and respective control of the tracker system is given.

Controlling the orientation of the solar generator based on the calculation of sun ephemerides is also disadvantageous. Based on sun ephemerides in connection with the location of the tracker and the time, the position of the sun at the sky can be determined with good accuracy, however, the accuracy depends on the accuracy of the sensors used for determining the position of the solar generator and also on the accuracy of the installation of the solar generators and their adjustment. Further, such systems (see e.g. ES 2 273 576 B1) use an open control loop necessitating initial calibration, e.g. based on a sensor or the short-circuit current. The actual control of the orientation of the solar generator during the day is only effected based on the calculated position of the sun, i.e. without returned positioning signal.

SUMMARY

According to an embodiment, a method for tracking a solar generator having a plurality of solar modules to the sun may have the steps of: tracking a tracker to the sun; and during movement or standstill of the tracker, detecting at least one electric output quantity of at least part of the solar modules of the solar generator; and based on a comparison of two values of the electric output quantity or based on a change of the electric output quantity, determining whether a position of the tracker has been reached where the electric output quantity lies within a range around a maximum value.

According to another embodiment, a control for a solar plant may have: an input for receiving a value of an electric output quantity of at least part of the solar modules of a solar generator of the solar plant; an output for providing a control signal for a tracker of the solar plant; and a processing unit operating according to the inventive method.

According to another embodiment, a solar plant may have: a solar generator having a plurality of solar modules; a tracker on which the solar generator is mounted; a measuring unit for detecting an electric output quantity of at least part of the solar modules of the solar generator; and an inventive control.

The present invention provides a method for tracking a solar generator having a plurality of solar modules to the sun, comprising:
  detecting at least one electric output quantity of at least part of the solar modules of the solar generator; and
  controlling a tracker, on which the solar generator is mounted, such that the detected electric output quantity comprises a predetermined value.

Further, the present invention provides a control for a solar plant, comprising:
  an input for receiving a value of an electric output quantity of at least part of the solar modules of a solar generator of the solar plant;
  an output for providing a control signal for a tracker of the solar plant; and
  a processing unit operating according to the inventive method.

Further, the present invention provides a solar plant, comprising:
  a solar generator having a plurality of solar modules;
  a tracker on which the solar generator is mounted;
  a measuring unit for detecting an electric output quantity of at least part of the solar modules of the solar generator; and
  an inventive control.

In contrary to the above stated conventional teachings, the present invention teaches an advantageous and novel approach for tracking a solar module to the sun avoiding the above described disadvantages. According to the invention, for tracking a solar generator to the sun, a sun position sensor can be omitted and hence the above discussed accuracy problems are avoided. Sun ephemerides for tracking the solar generator can also be omitted, such that the problems associated therewith can also be avoided.

According to the teachings of the present invention, tracking is performed based on an electric output signal or an electric output quantity, such as current, voltage and/or power, of part of the solar modules of the solar generator, based on an electric output quantity obtained by the entirety of all solar modules of the solar generator. The tracker of the solar plant is controlled such that the predetermined value of the electric output quantity assumes a maximum value, for example a maximum power. Thus, controlling the tracker effects tracking the tracker to the position of the sun.

According to an embodiment of the present invention, the tracker is initially arranged at an initial position by primary positioning of the system, where the tracker moves the solar generator based on known parameters regarding the position of the sun, e.g. sun ephemerides. In a movement of the tracker during tracking, for example starting from primary positioning, from a first position to a second position, a value of the electric output quantity is detected during a first part of the movement and during a second part of the movement, advantageously during a first half of the movement process and during a second half of the movement process. Values of the electric output quantity detected during the two parts of the movement are compared to one another, and based on the comparison it is determined that a position of the tracker where the predetermined value for the electric output quantity exists, has not yet been reached when the two values change. In this case, the tracker is moved further to a respective direction. If it is alternatively determined that the comparison shows that the two values do not change during the two parts of the movement, or do not significantly change, it is now assumed that the position of the tracker that has now been reached provides the predetermined output value, for example maximum power. Advantageously, the values of the electric output quantity are detected during the first and second part of the tracker movement. For this method, the relatively slow movement of the sun can be neglected compared to the fast movement of the tracker and the relative tracker position can be determined only based on the movement of the tracker. An alternative is the detection of the values of the electric output quantity during the first and second part of the tracker standstill. For this method, only the movement of the sun is a criterion for determining the relative tracker position. Combining both methods is also possible.

The movement of the tracker is incremental or continuous and during the method according to the sun without any change of rotation direction. In the case of incremental movement, the steps are shortened or prolonged, or provided less or more frequently, depending on the result of the comparison. A control signal for tracking the tracker can have a variable pulse length and a fixed frequency or a fixed pulse length and a variable frequency. In the case of a continuous movement of the tracker, acceleration or deceleration is effected. This ensures that for the case that the current position of the tracker is ahead of a position where maximum power can be achieved, the position of maximum power output is obtained by shortening the clock pulses or outputting the same less frequently or by decelerating, since the sun rather moves forward with respect to the tracker. Also, in the case that it is determined that the tracker position is behind a position of maximum power output, it is effected that the tracker reaches the location with maximum power output by prolonging the clock pulses or by outputting the same more frequently or by accelerating the movement.

The inventive approach can be used with any type of solar generators, however, the same is used together with solar generators having concentrator solar modules having a limited acceptance angle and where an angular dependence of the output electric quantity is clearly noticeable in all rotation directions of the tracker system.

BRIEF DESCRIPTION OF THE DRAWINGS

Embodiments of the present invention will be detailed subsequently referring to the appended drawings, in which.

DETAILED DESCRIPTION OF THE INVENTION

Based on FIG. 1, an embodiment of a solar plant will be described below, whose solar generator is tracked to the sun in the inventive manner. The solar plant 100 shown in FIG. 1 comprises a solar generator 102 comprising again a plurality of solar modules 104, advantageously concentrator solar modules. The solar generator 102 is mounted on a tracking plant (a tracker) 106 in a known manner. Tracker 106 is illustrated merely schematically in FIG. 1 and can be realized by any conventional approach. For simplicity reasons, the tracker 106 is only illustrated schematically in FIG. 1, as has been mentioned, however, the tracker 106 comprises all necessary elements for allowing a movement of the solar generator 102 for tracking to the sun, for example a movement in the direction of elevation and/or azimuth.

Figure 1:
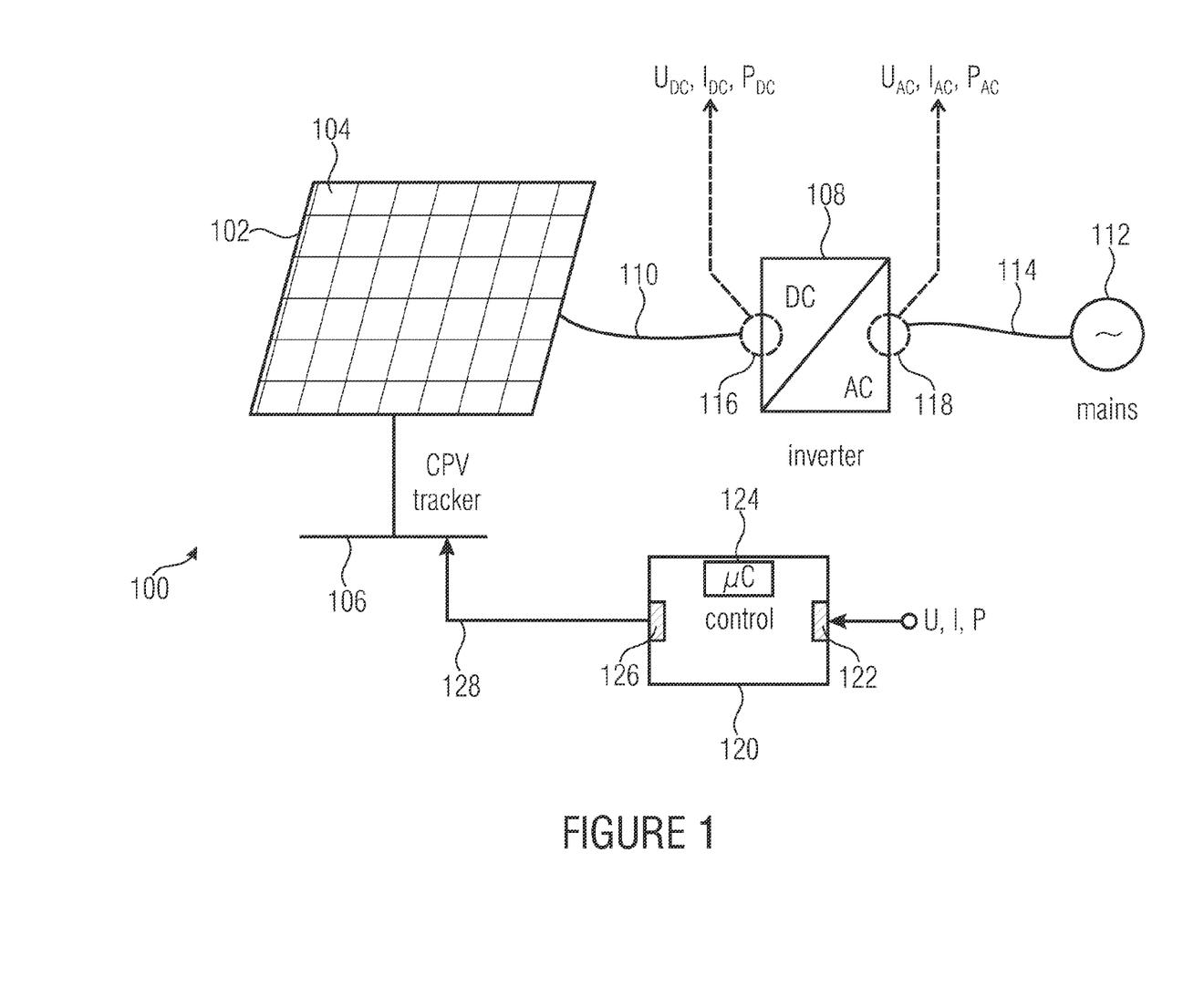
FIG. 1 is an embodiment of an inventive solar plant having CPV solar modules (CPV=Concentrator Photo Voltaic) tracked to the sun.

Further, the solar plant 100 comprises an inverter 108 connected to the solar generator 102 via a conductive connection 110, as shown schematically in FIG. 1. Via the conductive connection, for example an appropriate cable or the like, the power generated by the solar generator is output to the inverter 108 performing conversion of the direct current into alternating current to provide the generated energy to a mains 112 via a further conductive connection 114.

FIG. 1 shows schematically two measuring points 116 and 118. The electric measuring quantity, voltage, current and/or power necessitated for the inventive control for tracking the solar generator 102 is detected at these measuring points. A direct-current measuring device is provided at measuring point 116, which detects direct voltage $U_{DC}$, direct current $I_{DC}$ and/or direct power $P_{DC}$. Alternatively or additionally, a measuring device is provided at measuring point 118, which detects alternating voltage $U_{AC}$, alternating current $I_{AC}$ and/or alternating power $P_{AC}$ (DC=Direct Current; AC=Alternating Current).

Further, the inventive solar plant 100 comprises a control or regulator 120 receiving, at an input 122, the electric measurement quantities, i.e. voltage, current and/or power detected at measuring points 116 and/or 118. The control 120 comprises a processing unit 124, for example a microcontroller or computer capable of generating an output signal for controlling the tracker 106 based on the signals received at input 122 and providing the same at the output 126 to the control for transmission to the tracker 106 via connection 128. Thus, the control forms a regulator or power regulator effecting that the solar plant operates in a maximum power range, wherein the regulator is implemented to track the tracker such that maximum power is obtained or that the power output by the solar plant is within a predetermined power range (window).

The inventive system described based on FIG. 1 allows a sensor-free regulation for power maximization of a solar generator by using a mechanical tracker, wherein the solar generator is advantageously a concentrated photovoltaic plant, i.e. comprises concentrator solar modules. According to the invention, only the electric quantities of the solar plant 100 (photovoltaic tracker system) are used for tracking to the sun, namely the voltages, currents and/or powers shown in FIG. 1.

According to an embodiment, the just mentioned electric output quantities, i.e. voltage, current and/or power may only be used by part of the solar generator 102, i.e. only by individual or only one of the solar modules 104. Alternatively, the output quantity of the whole solar generator 102 may be used for tracking Optimizing tracking based on the electrical output quantity output by the entire system 102 is advantageous, since this allows maximization of the overall power output by the solar generator 102.

The mentioned electric quantities are detected at measuring points 116 and/or 118, wherein the anyway existing inverter 108 can be used for this. Alternatively, a separate measuring device can detect the electric output quantity at the solar generator, the inverter or any other suitable position within the solar plant 100. Actually, the electric quantities can be measured at any position in the power flow, for example at the input or output of the inverter as shown in FIG. 1.

It is an advantage of the present invention that no additional sun position sensor is necessitated for tracking. The position information is advantageously obtained merely by the electric quantities.

According to the present invention, a maximum electric power P of the solar generator 102 is sought for every rotation axis of the PV tracker system 106 based on its relative position to direct solar radiation. Current I and/or power P are used as position criterion. The inventive approach can be used for any solar generators having any solar modules. Advantageously, the inventive approach is used in solar generators 102 having concentrator cells 104. Since concentrator cells have a limited acceptance angle, the electric quantities I and P (current and power) are heavily influenced by the relative position of the solar generator 102 to the sun. Normally, this angular dependence of current and power has an effect on all rotation directions of the tracker system. Thus, control or regulation of power maximization will search the so-called "mechanical power maximum" by using several motors or rotation axes of the tracker 106. Here, it should be noted that the term "mechanical power maximum" states that the maximum power of the solar generator is defined based on the mechanical orientation of the solar generator 102 with respect to the sun by using the tracker 106.

The term "mechanical power maximum" is used for defining the same with respect to the term "electrical power maximum" which is obtained by using the so-called MPPT (MPPT=MaximumPowerPoint Tracker). This is electronic tracking that has nothing to do with the movement of the solar generator 102. Actually, electronic power maximization is performed by MPPT, whose aim it is to set voltage and current from the solar generator 102 such that their product is at a maximum. The MPPT for electric/electronic power maximization is known to persons skilled in the art. Differentiation between mechanical power maximization according to the present invention and electronic power maximization according to MPP tracking will be explained in more detail below.

Figure 2:
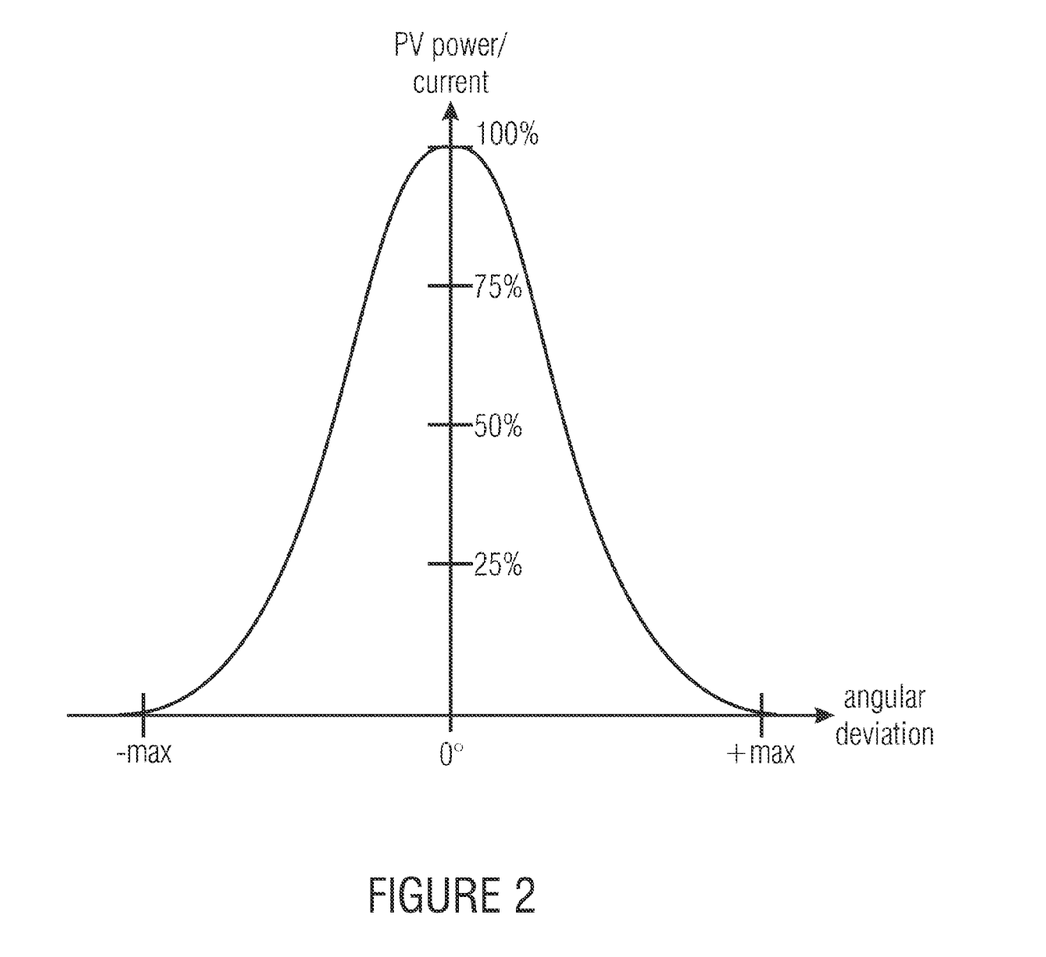
FIG. 2 is a typical curve of the output power or output current of a solar generator having a CPV-Tracker across the angular deviation between tracker direction and direct solar radiation.

FIG. 2 shows the typical power curve of a CPV tracker 106 across the angular deviation between the tracker unit and direct solar radiation. As can be seen, in particular concentrator cells show the maximum of their electrical power at 0° deviation between direct solar radiation and tracker direction, such that this is used as target for the inventive regulation. Other solar modules using no concentrator cells can show other power curves, wherein the same are, for example, wider, however, normally, the maximum power of the solar generator 102 or a respective solar module is at a minimum angular deviation.

According to the present invention, tracking whether the tracker and hence the solar generator 102 is within an allowed focus angle window, is performed during standstill of the tracker between parts of movement of the tracker and/or during the process of the tracker. Within the allowed focus angle window, the output power generated by the solar generator is in a maximum range. If the position regulation operates with pulse drive, it is defined as control target that every tracker impulse or every tracker movement is to be symmetrical to the power maximum, such that every rotation direction of the tracker during the day oscillates around the maximum power point, as can be seen in FIG. 3, which shows an example for a cycle of movement of sun and focused tracker in azimuth direction (FIG. 3a) with associated time power curve (FIG. 3b) and a cycle of movement of sun and unfocused tracker in azimuth direction (FIG. 3c) with associated time power curve (FIG. 3d).

Figure 3A:
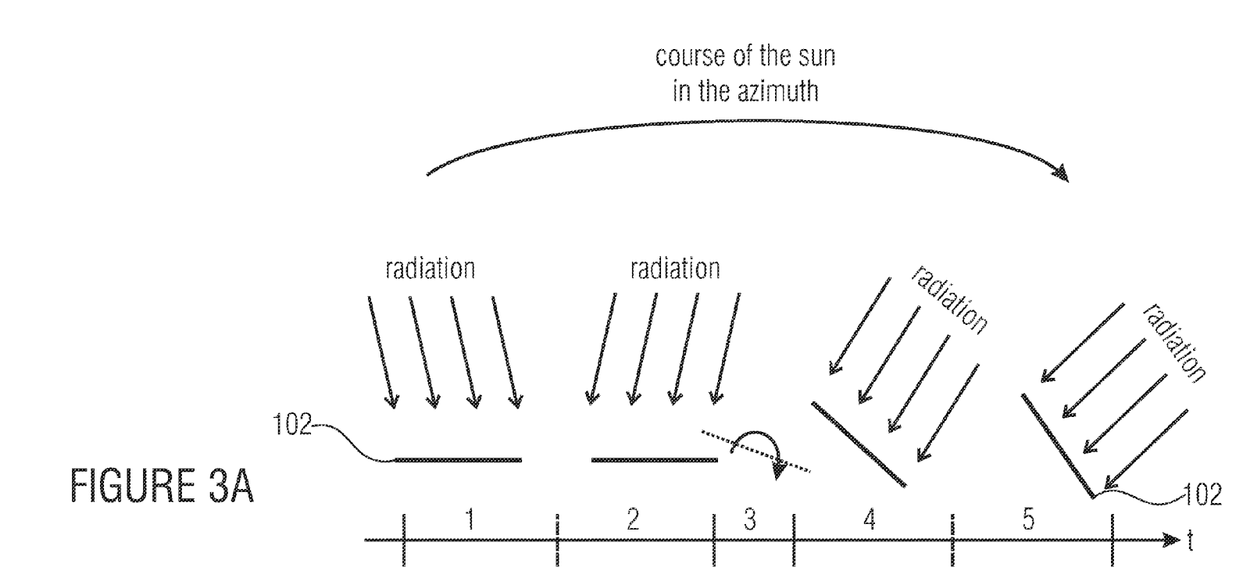
FIG. 3 is an example for a cycle of movement of sun and focused tracker in azimuth direction (FIG. 3a) with associated time power curve (FIG. 3b), and for a cycle of movement of sun and non-focused tracker in azimuth direction (FIG. 3c) with associated time power curve (FIG. 3d)
Figure 3B:
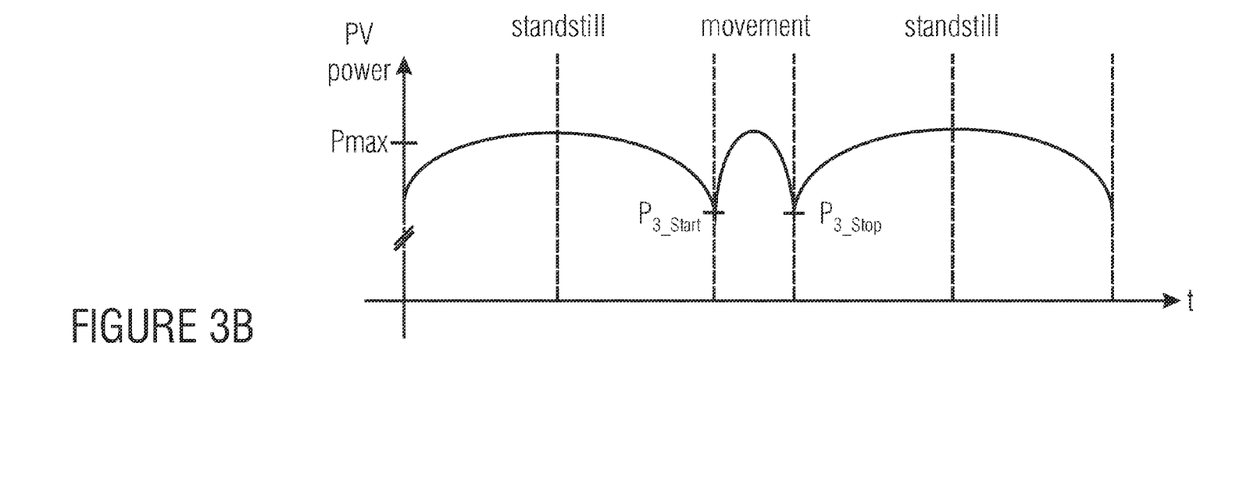

As can be seen from FIG. 3(a) and FIG. 3(b), the solar generator is in a respective angle window during time intervals 1 and 2, and the output power generated by solar generator 102 (see FIG. 3(b)) is in an allowable range around the maximum value. At the end of time interval 2, the power decreases to a value outside the allowed range, such that during the time interval 3 movement of the tracker is effected until a position of the tracker or solar generator 102 shown in parts 4 and 5 is reached, where an output power lying within a predetermined range around the maximum power is achieved for a certain time interval of the course of the sun.

In other words, in time intervals 1 and 2 it is determined based on the output power of the solar generator 102, by taking the inventive control as a basis, that the output power lies within an allowable range (determined by a predetermined percentage of the maximum power obtainable with current radiation) between $P_{3\_Start}$ and $P_{max}$, such that tracking is not necessitated. At the transition from time interval 2 to time interval 3, it is determined that the power has left the allowable range, such that movement of the tracker is necessitated until the power has again reached the allowable range between $P_{3\_Stop}$ and $P_{max}$. Subsequently, the tracker remains in the newly found position as illustrated in time intervals 4 and 5. When the tracker oscillates symmetrically to the focal point, $P_{3\_Start}=P_{3\_Stop}$ applies, as illustrated in FIGS. 3(a) and 3(b).

Figure 3C:
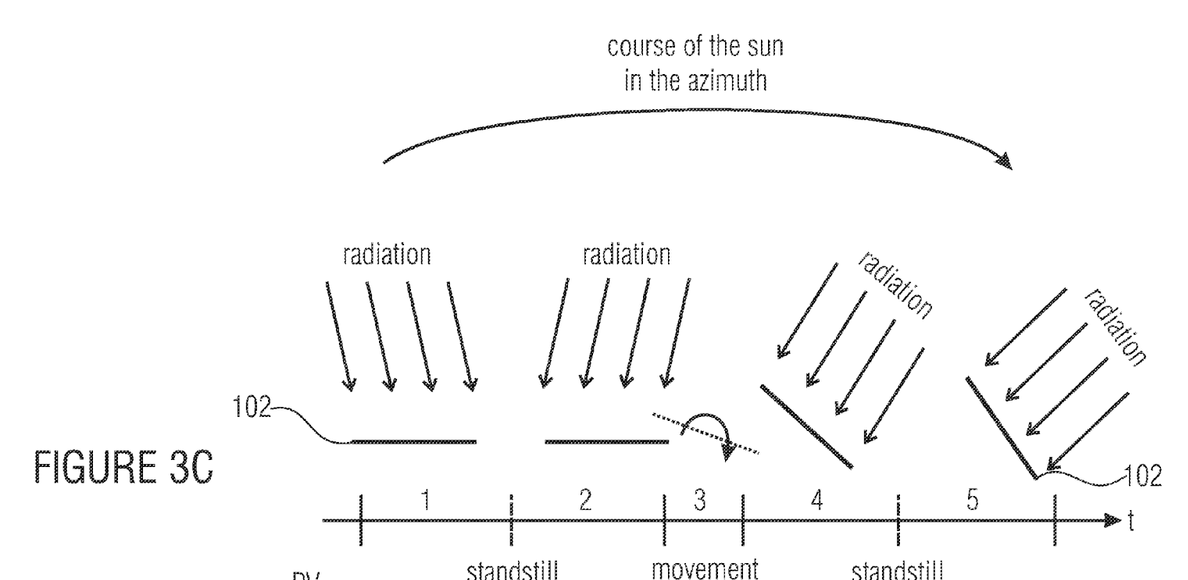
Figure 3D:
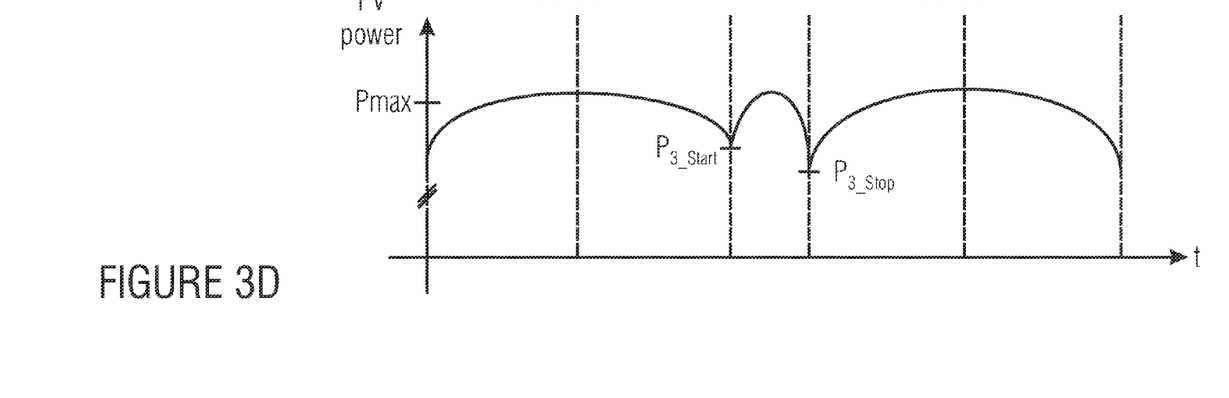

However, when the tracker is defocused, $P_{3\_Start}$ is unequal $P_{3\_Stop}$ ($P_{3\_Start}>P_{3\_Stop}$) as illustrated in FIGS. 3(c) and 3(d). FIGS. 3(c) and 3(d) present a situation where the tracker is ahead of the sun. When, however, $P_{3\_Start}<P_{3\_Stop}$ applies, this indicates that the tracker lags behind the sun. In such situations, the inventive approach effects control of the tracker resulting in a movement of the tracker, so that $P_{3\_Start}=P_{3\_Stop}$ applies.

FIG. 3 shows a position regulation by incrementally moving of the tracker, however, position regulation can also be based on a continuous method. In this case, the angular velocity of every tracker motor has to be set such that the same is located within the maximum or the allowable maximum range of the electric power, which can be obtained, for example by respectively varying the motor speed, which results in a similar power curve as in the pulsed variation according to FIG. 3. Advantageously, the measuring value detection is performed with very high resolution, such that in the pulsed variation the impulse amplitude it is normally kept very short. For that reason, the relative power variation between standstill and tracking cycle is very low and is at less than 0.1% of the maximum power obtainable with the current radiation.

In the following, based on FIG. 4, the inventive method according to an embodiment will be explained in more detail based on a flow diagram. In a first initial initialization step S100, primary positioning of the tracker is performed based on the information on the position of the tracker and the position of the sun at the time of primary positioning. This can be performed, for example, by means of an astronomical calculation of the position of the sun. Since the angle acceptance window is very small in the context of solar generators comprising concentrator solar modules, this primary positioning should be sufficiently exact in such an implementation of the solar generator, so that the electric quantities of the cell or the complete solar generator are available, such that a respective inventive power maximization, as will explained in more detail below, can take place. The accuracy of the primary positioning should at least allow reaching the angle acceptance window of the solar module, from which the electric quantities are available (e.g. +/−2.5° for CPV without secondary optics, +/−5° for CPV with secondary optics, +/−10° for Low CPV).

The primary positioning is intended to ensure the general operation and also the tracking of the sun in the case of bad weather conditions. Generally, the more precise the primary positioning, the higher the power-optimized tracking efficiency. One example for increasing primary precision is to consider spurious phenomena, such as tilting of the tower or pole of the tracker on which the solar generator is mounted. Tilting of the pole of 1 degree has, for example, an effect of 1 degree amplitude on the primary positioning accuracy. Compensating this tilting allows more efficient power-optimized positioning since the deviation of the primary positioning to the sun is smaller, and hence the mechanical search window to the point of maximum power becomes smaller.

In other embodiments where highly precise primary positioning is too expensive or not desired, coarse positioning of the tracker is sufficient in order to be able to perform inventive power maximization. Independent of power-optimized tracking, primary positioning can also be performed astronomically (calculating the ephemerides) or by using a sun position sensor. Alternatively, simple approximation functions can also be used for interpolating the sun's orbit.

After performing the above-described primary positioning, according to the embodiment, the power output by the solar generator is detected during a movement of the tracker from a first position to a second position, as described in step S102. Subsequently, the power P1 detected in a first part of the movement is compared to a power P2 detected in the second part of the movement in order to determine whether the powers are the same or whether power P1 is higher or less than power P2, as shown in step 104.

If power P1 is higher than power P2, the position of the tracker 106 with maximum power lies at an earlier position, i.e. the tracker has already been moved past the position for maximum power, as explained in step S106. In such a situation, the movement of the tracker is decelerated in step 108. If power P1 is less than power P2, this that the position of maximum power has not yet been reached, as shown in step S110, such that the movement of the tracker is accelerated in step S112. If it is found out that two powers are the same, it is determined that the position of maximum power is reached, as illustrated in step S114. Starting from steps S108, S112 and S114, the method then returns to step 102. Here, it should be noted that it can be determined according to the invention whether power generated by the solar plant is less than, higher than or equal to a maximum power. Alternatively, it can also be determined (see for example FIG. 3) whether power generated by the solar plant is within a predetermined power range or window or outside the predetermined power range or window (above or below the range). When the following description refers to a comparison with a value of an output quantity, this also includes reference to a respective window and vice versa.

Figure 4:
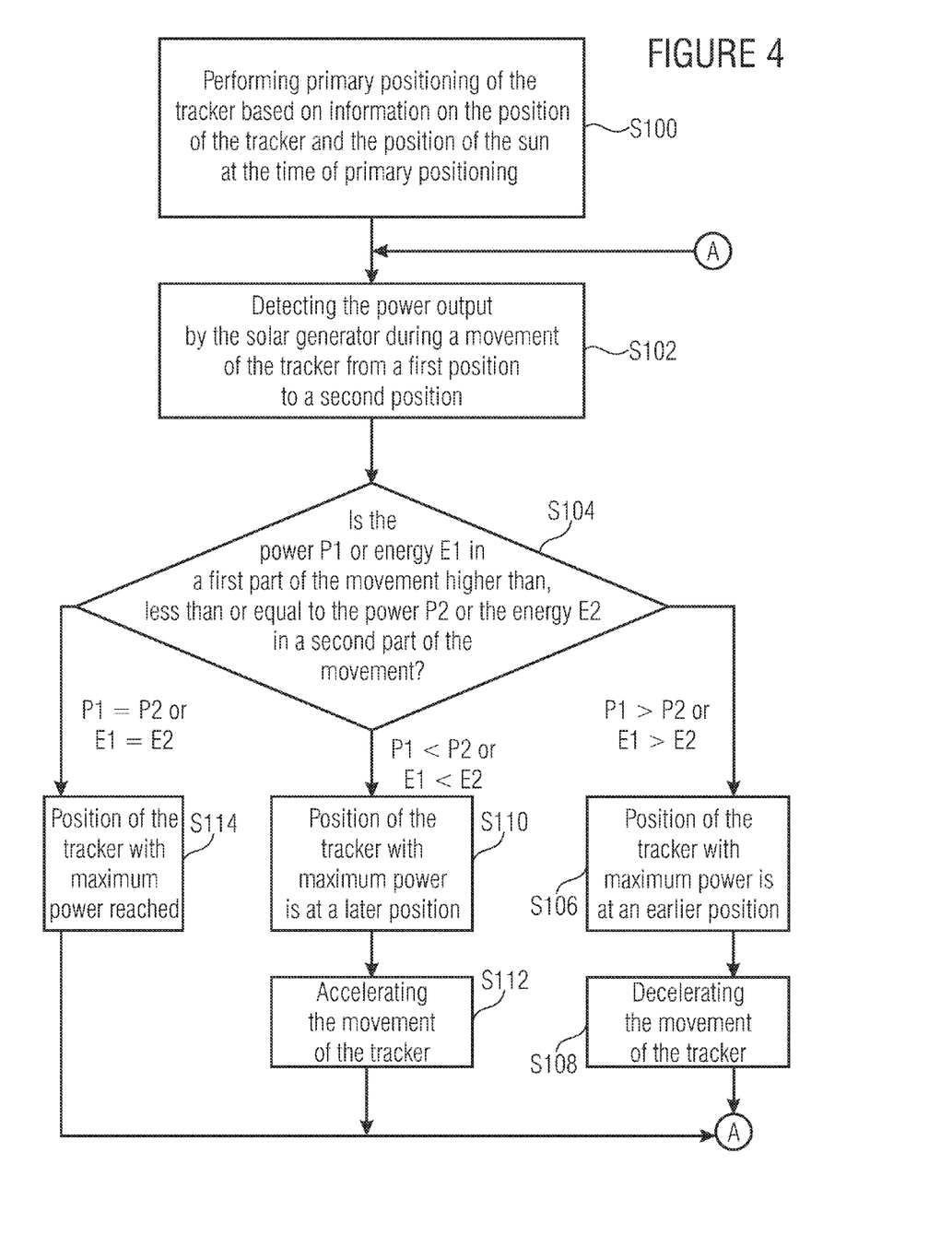
FIG. 4 is a flow diagram of the inventive method for tracking a solar generator to the sun according to an embodiment of the present invention.

According to the embodiment described based in FIG. 4 in steps S104 to S114, the electric power or current of the solar generator is measured during every motor impulse with a highly resolved measurement value detection at regular time or position intervals. Power or current measurement is performed synchronously with the physical tracker movement and can either be related to tracker motor run time or to the distance covered by the tracker detected by pulse generators.

Figure 5A:
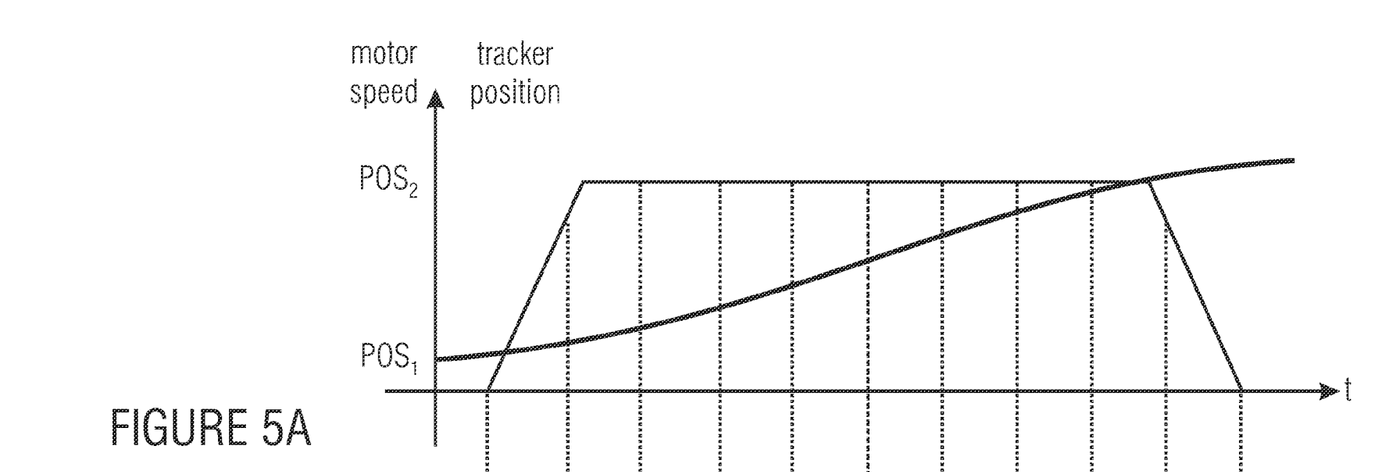
FIG. 5 is a representation of the motor speed or the tracker position during a control impulse (FIG. 5a) with associated curve of the power or the current with symmetrical measuring points (FIG. 5b)
Figure 5B:
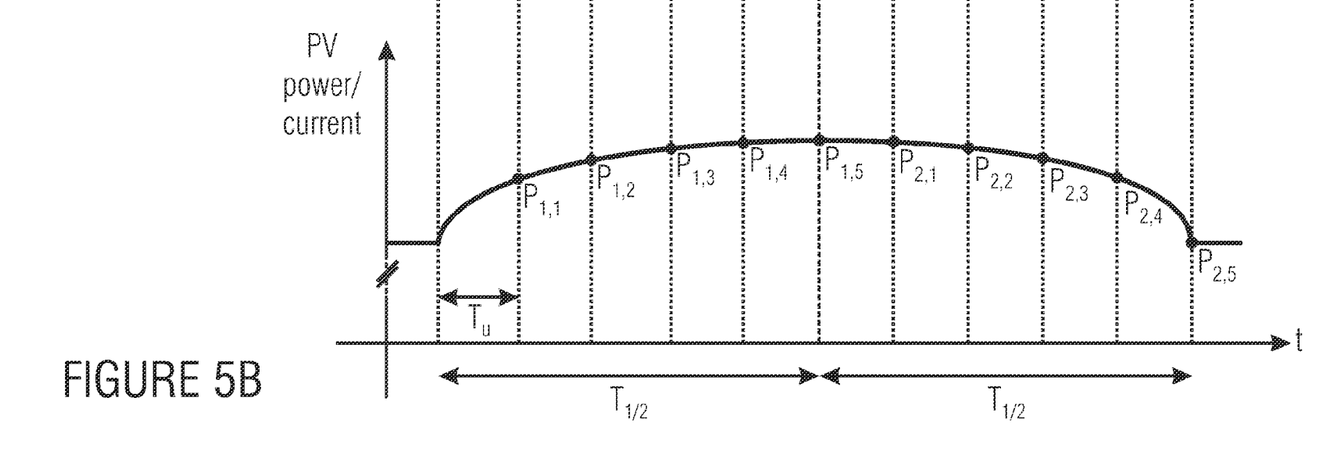

One example for determining the relative position of a rotation axis of a tracker to the sun is to divide the motor control pulse in two symmetrical time position or motor speed ranges, as shown in FIG. 5, showing the motor speed or tracker position during a control pulse in FIG. 5a. FIG. 5b shows the associated power curve with symmetrical measuring points.

As shown in FIG. 5, the tracker position changes from a first position $POS_1$ to a position $POS_2$ by respective motor activation and the course of movement is divided in two equal segments $T_{1/2}$ (see FIG. 5b). For each segment $T_{1/2}$, the power values are detected at different sampling points, namely powers $P_{1,1}$-$P_{1,5}$ for the first part or the first half of the movement period and $P_{2,1}$-$P_{2,5}$ for the second half of the motion period. The product of regular power or current measuring values with the time period that has passed since the last measurement results in an energy average. If the sum or integral of these regular energy averages is formed for every pulse half (see FIG. 5) two energy values are obtained that can be compared to one another. Power or current are measured with a fixed frequency and synchronously to motor movement, such that the just mentioned time can simply be omitted and only the power or current averages are compared to one another. In this case, the sum can be divided by the number of measuring points (in FIG. 5 the number of five measuring points). Alternatively, a first power or current measurement value and a second power or current measuring value can be measured per pulse half, as long as the same are detected symmetrically to the pulse center.

For the example shown based in FIG. 5, the average electric power of every pulse half results as follows:

first pulse half:

$$\overline{P}_1 = \frac{1}{n}\sum_1^n P_{1,i}$$

second pulse half:

$$\overline{P}_2 = \frac{1}{n}\sum_1^n P_{2,i}$$

The number of measuring points n of every pulse half depends on the pulse length and the measuring frequency, wherein in the example shown in FIG. 5, n=5.

Basically, during the motor pulse shown in FIG. 5, three different cases can occur, namely:
a. the power becomes higher: $\overline{P_1} < \overline{P_2}$
b. the power becomes less: $\overline{P_1} > \overline{P_2}$
c. the power remains the same: $\overline{P_1} = \overline{P_2}$.

Depending on which of these three cases occurs, it can be detected whether the maximum power point is either further ahead (a) or further behind (b) or whether the maximum power is already reached (c). As mentioned above, the determination can also be based on how the power lies with respect to a range or a window (see above).

One alternative to the just described measurement is the detection of energies during the pulse halves. The energy of each pulse half results as follows:
first pulse half:

$$E_1 = \Delta t \sum_1^n P_{1,i}$$

second pulse half:

$$E_2 = \Delta t \sum_1^n P_{2,i}$$

with $\Delta t$=duration of the respective pulse half.

A further alternative to the above described power measurement is the calculation of the derivation of the electric power during the pulse. If the sign of this derivation changes during the drive pulse, this means that maximum power has been reached. If the sign of the derivation remains positive at all times, power increases (case a), or if it remains negative at all times, power decreases (case b).

FIG. 5 is enlarged illustration of section 3 of FIG. 3. FIG. 5 illustrates how the important quantities, such as motor speed, generator pulses and PV power behave during tracker movement. Additionally, the power or current measuring points are inserted, wherein in the shown embodiment every shown point is the average of several measurements. Point $P_{1,2}$ for example, is the average of 3333 power or current measurements between $P_{1,1}$ and $P_{1,2}$ (33.33 kHz measurement frequency during 100 ms).

Power detection is performed by using a highly resolved power measurement. Due to the fact that the electric power of the solar tracker is very flat across the angular deviation to the sun (see FIG. 2) within the power maximum, the power changes only by a few watts across a certain position range. In order to ensure precise power detection for every rotation axis, very small power or current changes have to be measured. Due to that, the current or voltage measurement circuit needs to have a very high resolution. As an order of magnitude, power changes in the range of approximately 1/10,000 to 1/100,000 of the nominal power have to be detected in order to allow optimum tracking.

In the case of digital regulation, a normal current transformer and the associated A/D converter have a typical resolution of approximately 10 bits. The nominal power of a typical solar tracker is at approximately 10 kW, such that a power resolution of approximately 10 W/bit results, which is by a factor 100 higher than the necessitated accuracy of 0.1 W. However, this problem can be solved by time over sampling the necessitated measurement quantities U, I, whereby a higher resolution can be obtained. According to the Nyquist-Shannon-Theorem, the oversampling ratio (OS) is connected with the resolution increase in bits by the following equation:

$$OS_{RATIO} = 2^{2 \cdot (B_2 - B_1)}$$

wherein:
$B_1$=resolution of the normal measurement in bits, and
$B_2$=resulting resolution in bits of a sequence of individual measurements with resolution B1.

The number of measuring points necessitated to reach resolution $B_2$ is included in $OS_{RATIO}$. In the present example, the maximum number of measuring points is limited to 3333, such that the resulting bit resolution is calculated as follows:

3333=2^(2*(x−10)), resulting in x=15.85 (almost 16 bits).

It is assumed that the measurement value detection frequency is 33.33 kHz. Assuming that measurement values are detected across an overall time period of 100 ms, 3.333 measurement values are obtained. This means that the original resolution of 10 bits at 33.33 kHz has been transformed in a new resolution of approximately 16 bits at 10 Hz. Although now a reduced update rate of the measurement quantity exists, the new resolution according to the above stated example is approximately 0.15 W/bit, which almost corresponding to the necessitated resolution. Further, it should be noted that the update rate of 100 ms is sufficient, since the time constant of power change over the switch-on period of the motor is typically higher. Sufficient measuring points exist during a control pulse to apply the above-stated regulation principle according to which the two parts of the movement are considered.

The above-described approach avoids that expensive and costly members such as current and voltage transformers with increased measurement resolution have to be used. Thus, according to the invention, very high measurement accuracy increased by 65 times in the above example is obtained by using a normal measuring unit of an inverter.

The above-described detection of the relative tracker position to the sun on the basis of electric power presents feedback in relation to the primary tracker positioning, which can be corrected on the basis of information obtained in the inventive manner. In other words, starting from the primary positioning, the tracker can be moved slow or fast in dependence on the ratio of power P1 in the first part of the movement to power P2 in the second part of the movement to reach a range of maximum power. If primary positioning is omitted, the information obtained due to comparing the powers is applied directly to the power regulator (control 120), and, for example the length of every following motor pulse (pulse period) would be shortened or enlarged, depending on which of the cases stated in steps S106 and S110 is given.

In the case of feed back on the basis of primary regulation (primary positioning), correction of the tracker position is performed according to a predetermined algorithm, analyzing the result obtained according to steps S106 and S110 at every motor pulse and defining a respective procedure for power maximization. For example, fixed correction steps can be added on the primary actual or target positions, for the primary regulation to correct their delay or lead. In this case, the size of the correction step should be compromised between duration of the search method and desired position accuracy in continuous operation. The smaller the correction step, the better the position accuracy, but the longer the search duration until the maximum power point or power range is found.

Alternatively, variable correction steps can also be added to the primary positions. In this case, the size of correction step can be matched to the determined distance to the point of maximum power. If the comparison of the powers shows a large difference between P1 and P2, this will cause a respectively large correction step. In this case, the amplitude of the correction is defined proportionally to the amount of the difference (P2−P1). In the range of maximum power, this allows fine regulation with small correction steps in order to come as close as possible to the maximum.

Independent of the amplitude, the sign of the correction step depends on the sign of the difference (P2−P1). If this difference is positive, the tracker will move ahead due to the regulation (control 120). In this case, either a positive correction step is added to the target position or a negative correction step to the actual position. If the difference is negative, it is exactly vice versa.

For a higher reliability of the algorithm, further control steps can be introduced. One variation is to check the position information received in the inventive manner once or several times to ensure that the relative position of the tracker to the sun has been determined correctly, before the correction step is generated. These corrections can be based, for example, on further parameters regarding the position of the sun, for example sun ephemerides in order to cause plausibility check of the detected position. More accurately, based on the sun ephemeredes, it can be checked whether the position of the tracker really allows maximum solar radiation.

A further control step can be to pass the whole angle acceptance range of the solar generator, e.g. 2.5°×2.5° of a solar generator with concentrator solar cells regularly, for example once per hour, which ensures that the detected power maximum is no local maximum. However, it is disadvantage of this procedure that a short-term power setback takes place. Further, such a procedure should be defined under consideration of the susceptibility of the system to secondary radiation sources.

According to embodiments of the present invention, the search window for power maximization can be limited depending on the size of the angle acceptance window of the solar cells and the possible position error of the primary regulation. Thereby, it can be avoided that the correction (sum of many correction steps) of a certain rotation axis reaches values that are too high. If the position accuracy of the primary regulation is +/−1.5°, the search window can be limited to e.g. 1° with a certain tolerance.

If the electric power or the current of the photovoltaic system is to low, the so far described algorithm will be stopped. If the system power is below a certain minimum value, e.g. 5% of nominal power, there are several risks that the information on which the inventive approach is based will no longer be reliable. Smaller values of the power can have two reasons:

Radiation is very low (1% of nominal radiation). In this case, there is no point in running the MPPTm algorithm due to the increased signal-to-noise ratio (measurement accuracy).

Primary regulation was so bad that hardly any power is output (the solar generator has not reached the angle acceptance window).

If the electric power is limited for technical reasons, such as over current in the inverter, for example due to over temperature of the inverter or full charge of a battery, the algorithm will also be stopped. In this case, no reliable information can be obtained from the power comparison, since the power has been limited electronically and no longer results only from the mechanical tracker movement.

According to an embodiment of the present invention, positioning of every rotation axis of the tracker according to the maximum electric power is effected in the same direction of movement as the sun. The motor control pulses will either be defined shorter or output less frequently if the tracker position has a certain advance to the position of the sun, or, in contrary, will be defined longer or output more frequently if the tracker position lacks behind the position of the sun.

Advantageously, steps backward are avoided, such that the driving directions match the direction of movement of the sun. For a two-axis system, the azimuth angle is rotated to the west and the elevation angle to the zenith in the morning and to the horizon in the afternoon.

As long as position regulation operates using continuously driven motors, the motors would be correspondingly decelerated or accelerated, however, a change of direction would be omitted. Avoiding driving back is advantageous to prevent undesired temporary variations or continuous oscillations around the maximum power point. Further, this protects the whole system and in particular the motors from unnecessary moving back and forth, which saves energy and increases lifetime.

Basically, the principle of power maximization is not incompatible with bidirectional movement. In the case of a lead or a shift of the tracker position to the sun at the start of the system, such a bidirectional method can be provided to accelerate the transient time for searching the maximum power point. Here, the tracker is moved bidirectionally after reaching the angle acceptance window of the solar generator for the first time.

In the description above, the difference between electronic MPPT and mechanical MPPT has been discussed briefly. Normally, solar cells are operated with an MPPT, which has the effect that the same operate at their maximum power as has been discussed above. The same is here called MPPTe in order to avoid mix-up with the inventive described mechanical MPPTm.

If, in the inventive system, both MPPTe and MPPTm (inventive approach) are used, the voltage of the solar generator or the mechanical position of the tracker will be varied. Since any of the two regulation processes is to maximize electric power, it is intended in such an embodiment that these approaches do not influence or interfere with each other. Since the regulation quantities are different, and only very slightly influence each other under normal conditions, it is cared for that both regulators do not simultaneously vary their control variable. Simultaneous variation of the voltage of the solar generator and the tracker rotation axis would have effects on both regulators that could not be easily separated. Apart from simultaneously changing the tracker position and the DC voltage, unfavorably selected run times or measurement ranges could interfere the separation of the regulators, e.g.:

The MPPTm method can be static and the MPPTe changes the voltage during mechanical standstill.

The MPPTe compares a power value prior to the mechanical movement (U=U1) to a value after mechanical movement (U=U2) and takes a wrong decision regarding the P=f(U) behavior, since P has changed due to the mechanical movement.

As a result, separation in time between MPPTe and MPPTm is provided, which ensures that the same do not simultaneously vary the control variables. An offset operation of the two regulators with respective down times between voltage or position variations is sufficient to avoid mutual influence of the regulators.

Figure 6:
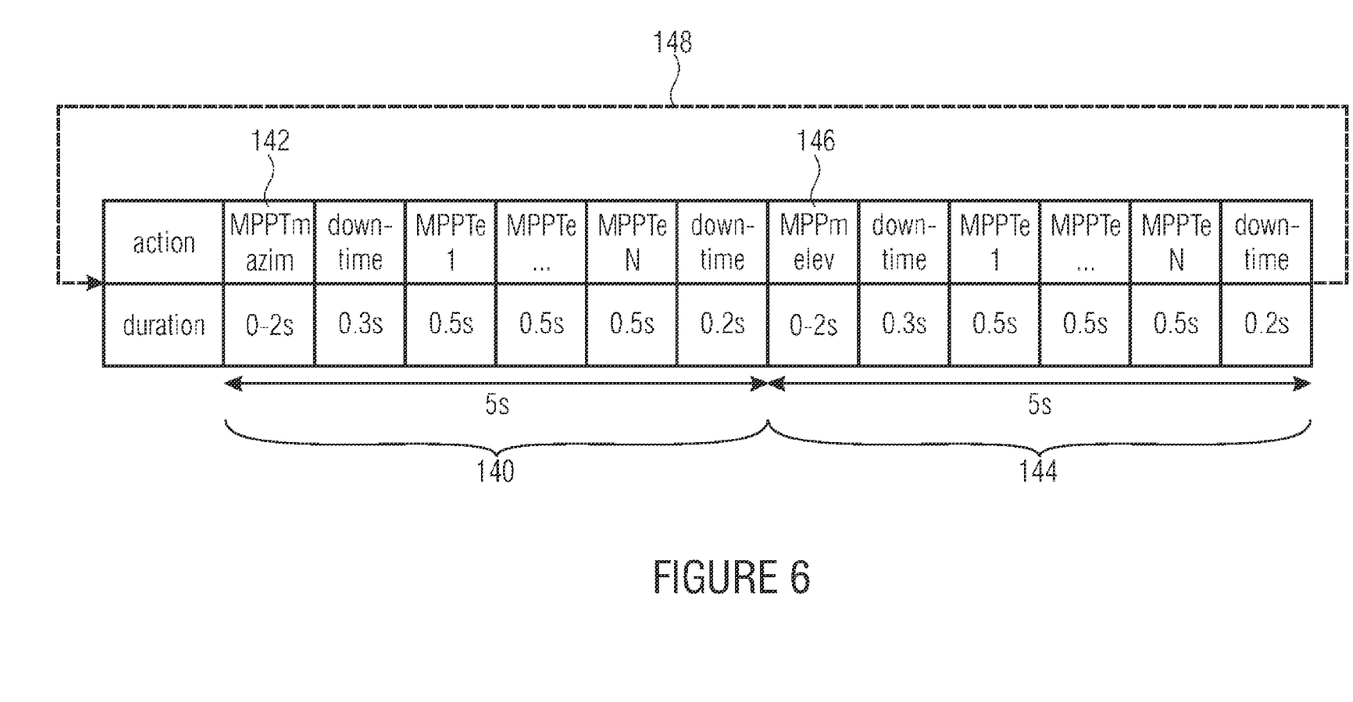
FIG. 6 is an example of time curves of MPPTe and MPPTm for a two-axes tracker with azimuth and elevation (MPPT=MaximumPowerPoint Tracker, MPPTe=electric MPPT, MPPTm=mechanical MPPT).

FIG. 6 is showing an example of the time curve of MPPTe and MPPTm for a two-axis tracker with azimuth and elevation. FIG. 6 shows the time curve describing the adjustment of the azimuth and elevation angle according to the teachings of the present invention for maximum power exploitation, wherein respective MPPTe portions are connected inbetween to ensure operation of the solar modules at their maximum power. The overall time period for a regulator cycle is 10 seconds. During a first portion 140 in time domain 142, the respective azimuth adjustment of the tracker is performed across a time period of 0-2 seconds by a respective pulse width modulation of the drive pulse(s) of the tracker motor for tracking the solar plant according to the teachings of the present invention. After a downtime of 0.3 seconds, MPPTe is effected having a time period of 0.5 seconds each. This is followed again by a downtime. Subsequently to the first portion 140, a second portion 144 follows, which again begins with the portion 146 for adjusting the tracker to the sun, now for adjusting the elevation angle by using a respective pulse width modulation of the drive pulse(s) of the tracker motor for tracking the solar plant according to the teachings of the present invention, as it is shown in portion 146. The MPPTe portions follow sandwiched between two downtimes. This course is repeated as indicated by arrow 148.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Method for tracking a solar generator to the sun, comprising:
   tracking a tracker to the sun;
   during movement of the tracker, detecting at least one electric output quantity of the solar generator;
   based on a comparison of two values of the electric output quantity or based on a change of the electric output quantity, determining whether a position of the tracker has been reached where the electric output quantity lies within a range around a maximum value; and
   if it is determined that a position of the tracker where the electric output quantity lies within the range around the maximum value has not been reached, modifying a control signal for the tracker;
      wherein modifying the control signal includes decelerating a movement of the tracker, if the tracker has been moved past the position where the electric output quantity lies within the range around the maximum value;
      wherein modifying the control signal includes accelerating a movement of the tracker if the tracker has not yet reached the position where the electric output quantity lies within the range around the maximum value, so that the tracker does not change the rotation direction during tracking to the sun; and
   wherein detecting the electric output quantity comprises:
      during a movement of the trackers from a first position to a second position, detecting a first value of the electric output quantity in a first part of the movement and detecting a second value of the electric output quantity in a second part of the movement;
      comparing the first value of the electric output quantity and the second value of the electric output quantity with one another; and
      based on the comparison,
      if the first and second values of the electric output quantity differ, determining that a position of the tracker where the electric output quantity lies within the range around the maximum value has not been reached, and if the first and second values of the electric output quantity comprise approximately the same amount, determining that a position of the tracker where the electric output quantity lies within the range around the maximum value has been reached.

2. Method according to claim 1, wherein the control signal comprises a variable pulse length and a fixed frequency.

3. Method according to claim 1, comprising:
   based on sun ephemerides or by using a sun position sensor, checking whether the determined relative position of the tracker to the sun is correct.

4. Method according to claim 1, comprising the following control step for checking the determined position:
   at predetermined times, passing an entire angle acceptance range of the solar generator, and
   based on the detected values of the electric output quantity during passing, determining whether a local or absolute maximum of the electric output quantity exists.

5. Method according to claim 1, wherein the values of the electric output quantity are detected during first and second parts of the tracker movement, wherein the values are detected at positions symmetrical to a midpoint of a range of movement of the tracker.

6. Method according to claim 1, wherein an average, a sum, an integral, a derivation or another mathematical function of the electric output quantity is used.

7. Method according to claim 6, wherein the tracker is moved incrementally or continuously, wherein in the case of incremental movement, the steps are shortened or lengthened depending on the comparison or provided less or more frequently, and wherein in the case of a continuous movement the tracker is decelerated or accelerated.

8. Method according to claim 1, wherein the method for controlling the tracker is interrupted when the value of the electric output quantity falls below a predetermined threshold or when the electric output quantity output by the solar generator is limited by further elements in the power flow, wherein in this case controlling the tracker is effected according to sun ephemerides or according to a sun sensor.

9. Method according to claim 1, comprising:
   performing primary positioning of the tracker based on parameters regarding a position of the sun.

10. Method according to claim 1, comprising:
   providing an MPP tracker, such that the solar modules operate at their maximum power,
   wherein the operation of the MPP tracker is decoupled in time from detecting the electric output quantity and controlling the tracker.

11. Method according to claim 1, wherein the electric output quantity is detected at the solar generator, at an inverter or by means of an additional measuring device.

12. Method according to claim 1, wherein the electric output quantity of plurality of solar modules of the solar generator is detected.

13. Method according to claim 12, wherein the plurality of solar modules comprises concentrator solar modules.

14. Method according to claim 1, wherein no additional sun position sensor is provided.

15. Method according to claim 1, wherein the electric output quantity comprises voltage, current, power or energy or an average, a sum, an integral, a derivation or another mathematical function of the same.

16. Method for tracking a solar generator to the sun, comprising:
tracking a tracker to the sun;
during movement of the tracker, detecting at least one electric output quantity of the solar generator;
based on a comparison of two values of the electric output quantity or based on a change of the electric output quantity, determining whether a position of the tracker has been reached where the electric output quantity lies within a range around a maximum value; and
if it is determined that a position of the tracker where the electric output quantity lies within the range around the maximum value has not been reached, modifying a control signal for the tracker;
wherein modifying the control signal includes decelerating a movement of the tracker, if the tracker has been moved past the position where the electric output quantity lies within the range around the maximum value;
wherein modifying the control signal includes accelerating a movement of the tracker if the tracker has not yet reached the position where the electric output quantity lies within the range around the maximum value, so that the tracker does not change the rotation direction during tracking to the sun; and
wherein the control signal comprises a fixed pulse length and a variable frequency, wherein the fixed pulse length depends on a desired position accuracy of the solar generator and/or a search duration until the electric output quantity lies within the range around the maximum value.

17. Method for tracking a solar generator comprising a plurality of concentrator photo voltaic (CPV) solar modules to the sun, comprising:
tracking a tracker to the sun;
during movement of the tracker, detecting at least one electric output quantity of at least part of the CPV solar modules of the solar generator;
based on a comparison of two values of the electric output quantity or based on a change of the electric output quantity, determining whether a position of the tracker has been reached where the electric output quantity lies within a range around a maximum value; and
if it is determined that a position of the tracker where the electric output quantity lies within the range around the maximum value has not been reached, modifying a control signal for the tracker,
wherein modifying the control signal comprises decelerating a movement of the tracker, if the tracker has been moved past the position where the electric output quantity lies within the range around the maximum value, and
wherein modifying the control signal comprises continuing a movement of the tracker if the tracker has not yet reached the position where the electric output quantity lies within the range around the maximum value, so that the tracker does not change the rotation direction during tracking to the sun;
wherein detecting the electric output quantity comprises:
during a movement of the trackers from a first position to a second position, detecting a first value of the electric output quantity in a first part of the movement and detecting a second value of the electric output quantity in a second part of the movement;
comparing the first value of the electric output quantity and the second value of the electric output quantity with one another; and
based on the comparison,
if the first and second values of the electric output quantity differ, determining that a position of the tracker where the electric output quantity lies within the range around the maximum value has not been reached, and if the first and second values of the electric output quantity comprise approximately the same amount, determining that a position of the tracker where the electric output quantity lies within the range around the maximum value has been reached.

18. Method for tracking a solar generator comprising a plurality of concentrator photo voltaic (CPV) solar modules to the sun, comprising:
tracking a tracker to the sun;
during movement of the tracker, detecting at least one electric output quantity of at least part of the CPV solar modules of the solar generator;
based on a comparison of two values of the electric output quantity or based on a change of the electric output quantity, determining whether a position of the tracker has been reached where the electric output quantity lies within a range around a maximum value; and
if it is determined that a position of the tracker where the electric output quantity lies within the range around the maximum value has not been reached, modifying a control signal for the tracker,
wherein modifying the control signal includes decelerating a movement of the tracker, if the tracker has been moved past the position where the electric output quantity lies within the range around the maximum value, and
wherein modifying the control signal includes continuing a movement of the tracker if the tracker has not yet reached the position where the electric output quantity lies within the range around the maximum value, so that the tracker does not change the rotation direction during tracking to the sun,
wherein the control signal includes a fixed pulse length and a variable frequency, wherein the fixed pulse length depends on a desired position accuracy of the solar generator and/or a search duration until the electric output quantity lies within the range around the maximum value.

* * * * *